(12) United States Patent
Melton (10) Patent No.: US 11,320,264 B2
(45) Date of Patent: May 3, 2022

(54) LASER PLUMB BOB AND LEVEL AID

(71) Applicant: Joeseph Samuel Melton, Simpsonville, SC (US)

(72) Inventor: Joeseph Samuel Melton, Simpsonville, SC (US)

( * ) Notice: Subject to any disclaimer, the term of this patent is extended or adjusted under 35 U.S.C. 154(b) by 274 days.

(21) Appl. No.: 16/597,733

(22) Filed: Oct. 9, 2019

(65) Prior Publication Data

US 2020/0116485 A1 Apr. 16, 2020

Related U.S. Application Data

(60) Provisional application No. 62/743,696, filed on Oct. 10, 2018.

(51) Int. Cl.
*G01C 15/10* (2006.01)
*G01C 15/00* (2006.01)
*G01C 15/12* (2006.01)

(52) U.S. Cl.
CPC ......... *G01C 15/105* (2013.01); *G01C 15/004* (2013.01); *G01C 15/12* (2013.01)

(58) Field of Classification Search
CPC .............................. G01C 15/105; G01C 15/004
USPC ............................................ 33/286, 283, 291
See application file for complete search history.

(56) References Cited

U.S. PATENT DOCUMENTS

| | | | | |
|---|---|---|---|---|
| 5,539,990 A * | 7/1996 | Le | ........... | G01C 15/004 33/283 |
| 5,748,306 A * | 5/1998 | Louis | ........... | G01B 11/26 356/153 |
| 5,864,956 A * | 2/1999 | Dong | ........... | G01C 15/105 33/227 |
| 5,912,733 A * | 6/1999 | Dunlop | ........... | G01C 15/105 356/250 |
| 6,065,217 A * | 5/2000 | Dong | ........... | G01B 11/26 33/276 |
| 6,397,484 B1 * | 6/2002 | Greene | ........... | G01C 15/105 33/392 |
| 6,735,879 B2 * | 5/2004 | Malard | ........... | G01B 11/26 33/286 |
| 6,763,595 B1 * | 7/2004 | Hersey | ........... | G01C 15/004 33/286 |
| 7,031,367 B2 * | 4/2006 | Marshall | ........... | G01C 9/12 33/281 |
| 7,055,252 B2 * | 6/2006 | Wu | ........... | G01C 15/00 33/286 |
| 7,134,211 B2 * | 11/2006 | Bascom | ........... | G01C 15/004 33/286 |
| 7,178,250 B2 * | 2/2007 | Nash | ........... | G01C 15/004 33/286 |
| 7,269,907 B2 * | 9/2007 | Levine | ........... | G01C 15/004 248/183.2 |

(Continued)

FOREIGN PATENT DOCUMENTS

EP 1564523 A2 * 8/2005 ........... G01C 15/004

*Primary Examiner* — Christopher W Fulton
(74) *Attorney, Agent, or Firm* — Cynthia S. Lamon; Lamon Patent Services (57) ABSTRACT

A plumb-bob device has an enclosure with three lasers projecting from one end, one of which projects a horizontal lane, one in a vertical plane, and one with crossed planes from a laser that is suspended to swing but not rotate about an axis. The device may be attached to an object to be leveled or plumbed, and moving the object until the lasers coincide accomplishes plumbing the object.

9 Claims, 6 Drawing Sheets

(56) References Cited

U.S. PATENT DOCUMENTS

| | | | | |
|---|---|---|---|---|
| 7,287,336 | B1* | 10/2007 | Goodrich | G01C 15/008 33/227 |
| 7,363,716 | B1* | 4/2008 | Tonkinson | A47G 1/205 33/286 |
| 7,367,129 | B2* | 5/2008 | Lu | G01C 15/002 33/286 |
| 7,467,474 | B1* | 12/2008 | Statham | G01B 11/272 33/286 |
| 7,571,546 | B1* | 8/2009 | Sergyeyenko | G01C 15/02 33/291 |
| 7,690,124 | B1* | 4/2010 | Henry | G01C 15/004 33/286 |
| 8,307,562 | B2* | 11/2012 | Bascom | G01C 15/004 33/286 |
| 9,103,668 | B2* | 8/2015 | Smith | G01C 3/08 |
| 9,441,963 | B2* | 9/2016 | Yuen | G01C 9/06 |
| 10,119,817 | B2* | 11/2018 | Spaulding | G01C 15/004 |
| 11,125,558 | B2* | 9/2021 | Bernhard | G01C 25/005 |
| 2006/0179672 | A1* | 8/2006 | Tacklind | G01C 15/004 33/286 |
| 2007/0044332 | A1* | 3/2007 | Yung | G01C 15/002 33/286 |

* cited by examiner

LASER PLUMB BOB AND LEVEL AID

CROSS-REFERENCE TO RELATED APPLICATIONS

The present application claims priority to provisional patent application 62/743,696, filed Oct. 10, 2018. All disclosure of the parent application is herein incorporated at least by reference.

BACKGROUND OF THE INVENTION

1. Field of the Invention

The present invention is in the technical field of measuring apparatus useful in construction and building trades, and relates more specifically to a plumb bob that uses an arrangement of lasers.

2. Description of Related Art

Devices for determining level and plumb for objects and assemblies, such as walls and posts, for example, are well known in the art. A simple example is a bubble level that comprises an elongated framework having a sealed tube containing water, or a similar liquid with a bubble in the liquid. A long axis of the tube is accurately positioned to be at a right angle to a surface of the elongated framework. A mark is implemented on the tube to indicate a center position of the tube. The surface of the elongated frame is placed on a surface of an object to be leveled (or plumbed) and position of the bubble in the tube is an indication of the deviation from level of the surface of the object. If the bubble is centered on the mark indicating the center, or between centering marks on the tube, the surface of the object is considered to be plumb.

A significant problem with bubble level devices is simply accuracy. A small deviation from plumb of the surface of the object may be very difficult to discern by looking at the position of the bubble.

Another method for determining plumb is by suspending a weight at the end of a long string. An opposite end of the string is attached to a point on a surface of the object to be leveled (or plumbed). Gravity will ensure that the string is vertical, and the object may be moved such that an edge of a vertical surface of the object coincides with the vertical string.

Mechanical and light-implemented devices are known in the art, but a common failing of such devices is that they most often output a sound of alert of another sort to indicate level is achieved. Most craftsmen, however, will not trust a device they cannot sight themselves. Another common problem is that the conventional device requires two craftsmen to use the device.

What is clearly needed is a device that may be used conveniently and efficiently by one craftsman that is very accurate, may be sighted in process of use, and is easy to use.

BRIEF SUMMARY OF THE INVENTION

In one embodiment of the invention a plumb-bob device is provided, comprising a framed enclosure having first and second planar ends, first and second planar sides, a top planar surface and a bottom planar surface, a first laser device in the framed enclosure, projecting in a first plane from the first end, the first plane orthogonal to the bottom surface, a second laser device in the framed enclosure, projecting in a second plane from the first end, the second plane parallel with the bottom surface, and at a right angle to the projected plane of the first laser device, a third laser device in the framed enclosure, projecting in a third and a fourth plane crossed orthogonally, the third plane the third laser device suspended by a linear member from a joint on a rigid frame member in the enclosure, such that the third laser device projects in a direction of an axis of the linear member, and may swing in any direction relative to the axis of the linear member, but may not rotate about that axis, and such that with the axis of the linear member orthogonal to the first planar end, the third plane is parallel to the first plane, and the fourth plane is parallel to the second plane, a power supply and circuitry adapted to power the lasers, and an attachment interface on the bottom surface adapted to attach the device to a planar surface of an external object.

In one embodiment, the attachment interface comprises a series of magnetic strips on the bottom surface, the strips presenting a bottom plane parallel with and away from the bottom surface, such that placing the device by the strips on a plane surface of an object comprising magnetically permeable material attaches the device to the object. Also, in one embodiment the device further comprises a pointed pin acting through the device vertically, orthogonal to the top and bottom surfaces, the pin connected to a palm button above the top surface, with a compression spring constraining the pin to be withdrawn to above the bottom surface of the magnetic strips, until a user presses the palm button, advancing the pointed pin to pierce and engage a pliable surface of an object, fastening the device to the surface of the object. In one embodiment the device further comprises a first stationary spot laser projecting orthogonally from the planar first side, a second stationary spot laser projecting orthogonally from the planar second side, co-linear with the first stationary spot laser, and a third stationary spot laser projecting orthogonally from the planar second end, the three stationary spot lasers lying in a common plane. And in one embodiment the circuitry further comprises a first normally open proximity switch implemented on the bottom surface of the enclosure near the first end, and a second normally open proximity switch implemented on the bottom surface of the enclosure near the second end, such that, as the bottom plane of the strips contact a planar surface of an external object, both switches close, indicating that the device is intimately joined to the external object, and closing a circuit that lights the lasers of the device.

In one embodiment the power supply is a rechargeable battery, and further comprising a charging port on one surface of the enclosure. In one embodiment the first and second lasers radiate red and the third laser radiates yellow, such that, when projections coincide, the color turns orange. In one embodiment the enclosure is formed of rigid polymer material.

In another aspect of the invention a laser-implemented plumb bob system is provided, comprising a tripod apparatus having foldable and extendable legs, and a planar mounting plate of magnetically-permeable material, the planar mounting plate adapted by universal joint to the tripod to be oriented to attain a position wherein the plane of the mounting plate is vertically plumb with respect to a surface upon which the tripod rests, and a laser-implemented plumb bob device having a framed enclosure having first and second planar ends, first and second planar sides, a top planar surface and a bottom planar surface, a first laser device in the framed enclosure, projecting in a first plane from the first end, the first plane orthogonal to the bottom surface, a second laser device in the framed enclosure, projecting in a second plane from the first end, the second plane parallel with the bottom surface, and at a right angle to the projected plane of the first laser device, a third laser device in the framed enclosure, projecting in a third and a fourth plane crossed orthogonally, the third plane the third laser device suspended by a linear member from a joint on a rigid frame member in the enclosure, such that the third laser device projects in a direction of an axis of the linear member, and may swing in any direction relative to the axis of the linear member, but may not rotate about that axis, and such that with the axis of the linear member orthogonal to the first planar end, the third plane is parallel to the first plane, and the fourth plane is parallel to the second plane, a power supply and circuitry adapted to power the lasers, and a magnetic attachment interface on the bottom surface joining the laser-implemented plumb bob device to the adapted to attach the device to a planar surface of an external object. The laser-implemented plumb bob device is mounted to the planar mounting plate of the tripod device by magnetic attraction.

DETAILED DESCRIPTION OF THE INVENTION

Figure 1:
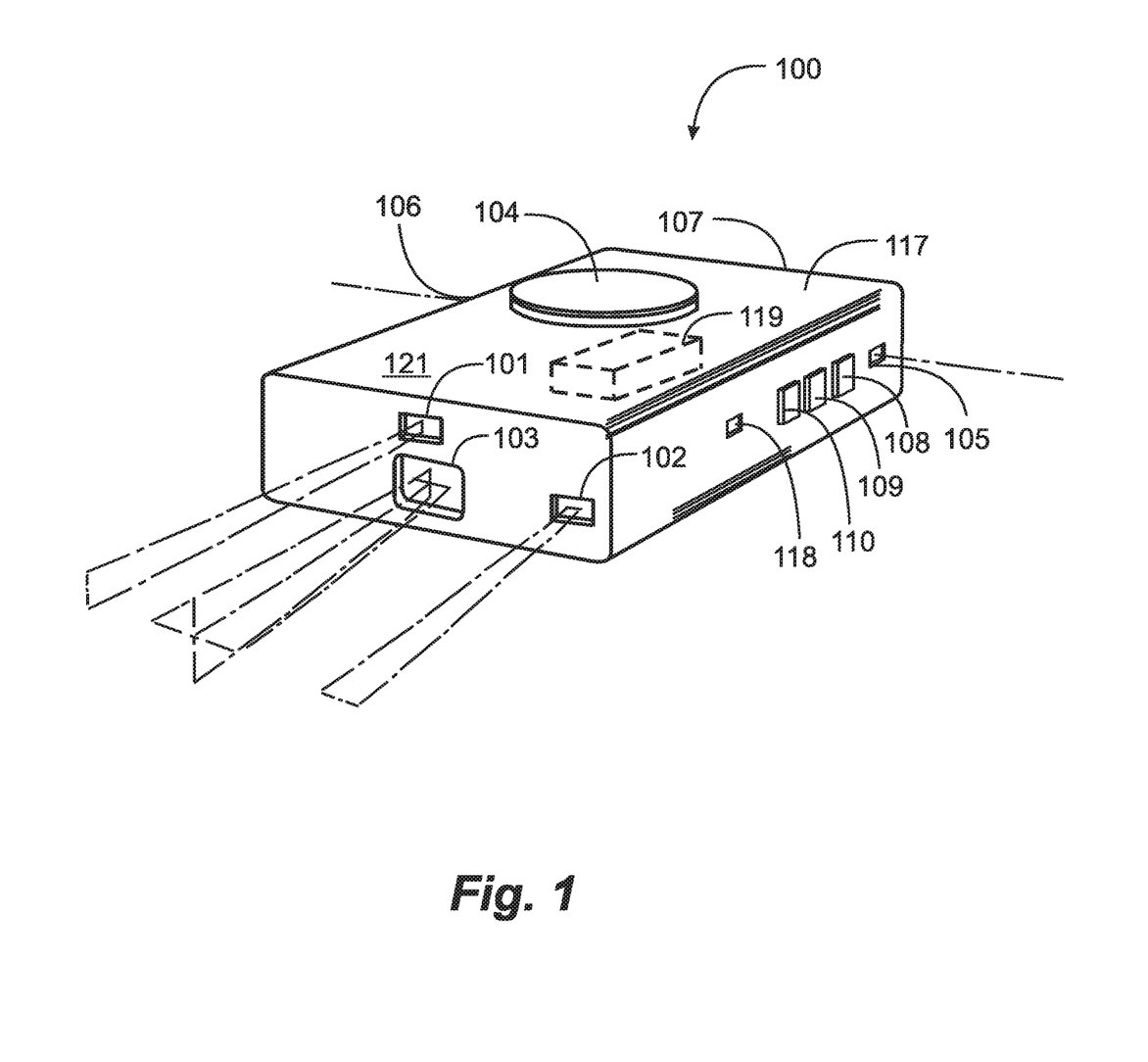
FIG. 1 is a perspective view of a laser plumb bob device in an embodiment of the present invention.

FIG. 1 is a perspective view of a laser plumb bob device 100, in an embodiment of the present invention. Device 100 is implemented in a substantially rectangular enclosure 117, which may be sheet metal in some embodiments or polymer material in other embodiments. Enclosure 117 may be rectangular in shape with a top, bottom, front, back and two opposite elongate sides. Device 100 includes, on one side surface, three openings through which laser devices 101, 102, and 103 may be mounted inside the enclosure and are enabled to radiate shaped laser beams outside of enclosure 117. A first laser device 101, positioned centrally between the opposite sides of enclosure 117, is adapted to present a laser beam in a vertical plane. A second laser device 102 is positioned to one side within the enclosure 117 and is adapted to present a laser beam through the front of the enclosure 117 in a horizontal plane with reference to the enclosure 117 positioned as shown. A third laser device 103 is implemented within the enclosure 117 in a manner suspended from a universal pivot. The operation and function of laser device 103 is described further in enabling detail below.

A disk 104 on a top surface 121 of enclosure 117 is an operator that a user may push against a spring to set a pin (not shown in FIG. 1) on the underside of device 100, to fasten the device to any planar surface or wooden surface. Three stationary spot lasers 105, 106, and 107 are provided to radiate in three orthogonal directions excepting the direction of laser devices 101, 102 and 103. A button switch 108 is on/off for power. Button switch 109 toggles laser 101 on and off, and a button switch 110 toggles laser 102 on and off.

In one embodiment the lasers are powered by an on-board power supply, such as a rechargeable battery 119, and a recharging port 118 may be provided.

Figure 2:
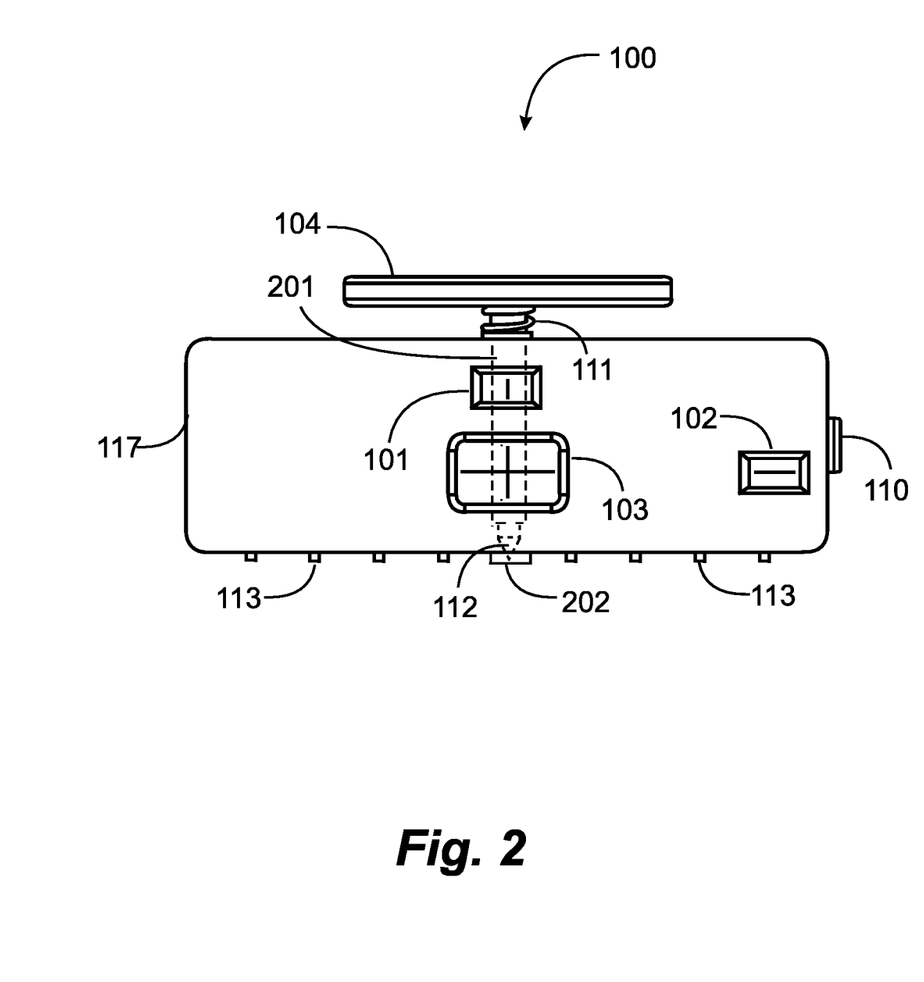
FIG. 2 is an elevation view of the laser plumb bob device of FIG. 1

FIG. 2 is a front elevation view of the laser plumb bob device 100 of FIG. 1. Disk 104 is seen in additional detail joined to a shaft 201 constrained by a compression spring 111, the shaft passing vertically through device 100, to operate a drive pin 112 extending below device 100. There are a plurality of magnetic strips 113 joined to a bottom surface 120 of enclosure 117, the lowermost surfaces of the strips 113 defining a plane parallel with the bottom surface of enclosure 117, enabling the device 100 to attach magnetically to magnetically permeable metal surfaces, such as iron and steel. Drive pin 112, in default position, prior to being pushed into a pliable surface, has a point that is above the surface defined by strips 113. A spring-loaded shaft 201 is implemented near or at a center point of the device 100, and extends just marginally below a plane defined by strips 113. When a user places device 100 against a surface such that strips 113 all contact the surface, switches 202 will close as the device seats on the surface to which the device 100 is applied. The closing of switches 202 signals that the device is seated, and enables power to the lasers. If the surface to which device 100 is applied magnetically, for example on a metal surface, the device 100 will seat and stay stationary by the magnetic attraction of strips 113. If the surface is wood, or other pliable material, the user may push disk 104 to extend pin 112 to engage the surface to hold the device 100 in place.

Figure 3:
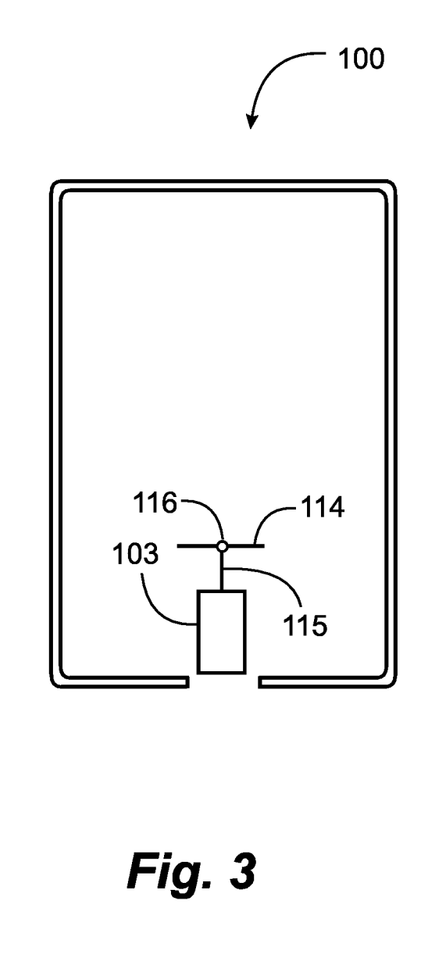
FIG. 3 is a diagrammatical section view of the laser plumb bob device of FIGS. 1 and 2.

FIG. 3 is a diagrammatical section view of the laser plumb bob, device 100 of FIGS. 1 and 2, taken along a plane through the center of laser device 103 and parallel to the top and bottom parallel surfaces of device 100. A frame member 114 is a rigid member within enclosure 117 that is joined to enclosure 117. Laser device 103 is suspended from frame member 114 by a linear member or pin 115 from a joint 116 having two degrees of freedom. Laser device 103 may swing in any direction relative to an axis of linear pin 115, but may not rotate about that axis. As such, laser 103 descends from a center point of member 114 by gravity, such that linear pin 115 and the output of laser device 103 will tend to seek vertical. The cross radiated by laser device 103 will remain aligned with the horizontal and vertical relative to the frame of enclosure 117.

Figure 4:
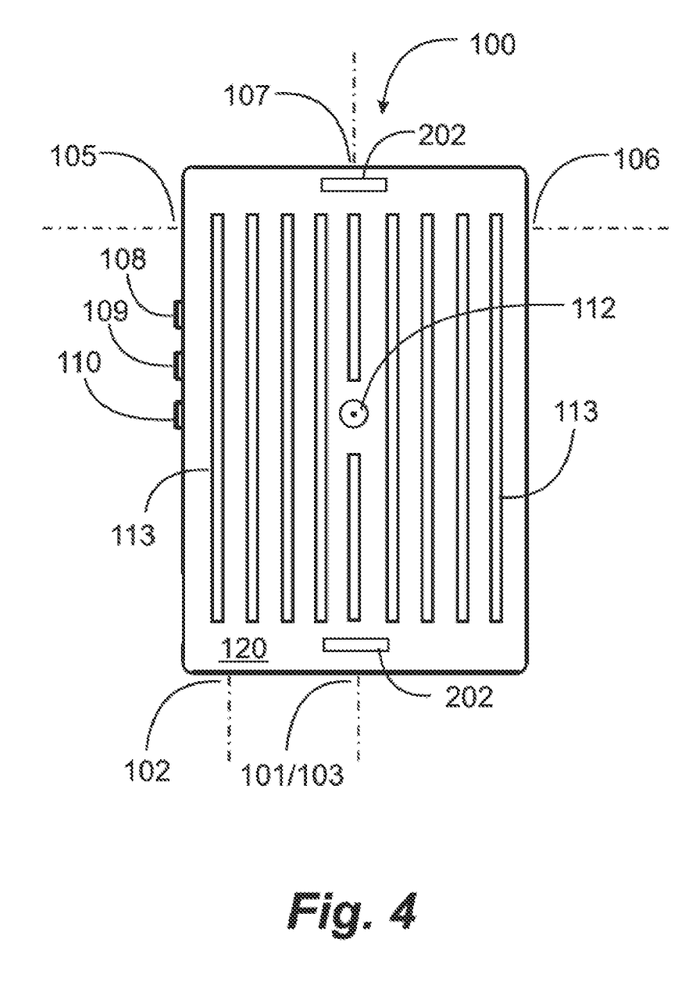
FIG. 4 is a plan view of the laser plumb bob of FIGS. 1, 2 and 3, seen from the underside.

FIG. 4 is a plan view of laser plumb bob device 100 seen from the underside 120. Magnetic strips 113 seen from the side in FIG. 2 are seen in FIG. 4 in a planar array. Not all are annotated with element numbers to avoid confusion. Projection of spot lasers 105, 106, and 107 are shown in orthogonal relationship to one another, projection to each side and to the rear. Shaped laser devices 101, 102 and 103 all three project to the front. Position of switches 202 are shown at each end of the magnetic strip array, such that the closing of both switches 202 is a sure indication that strips 113 are intimately engaged to a surface capable of attracting magnetic strips 113.

Figure 5:
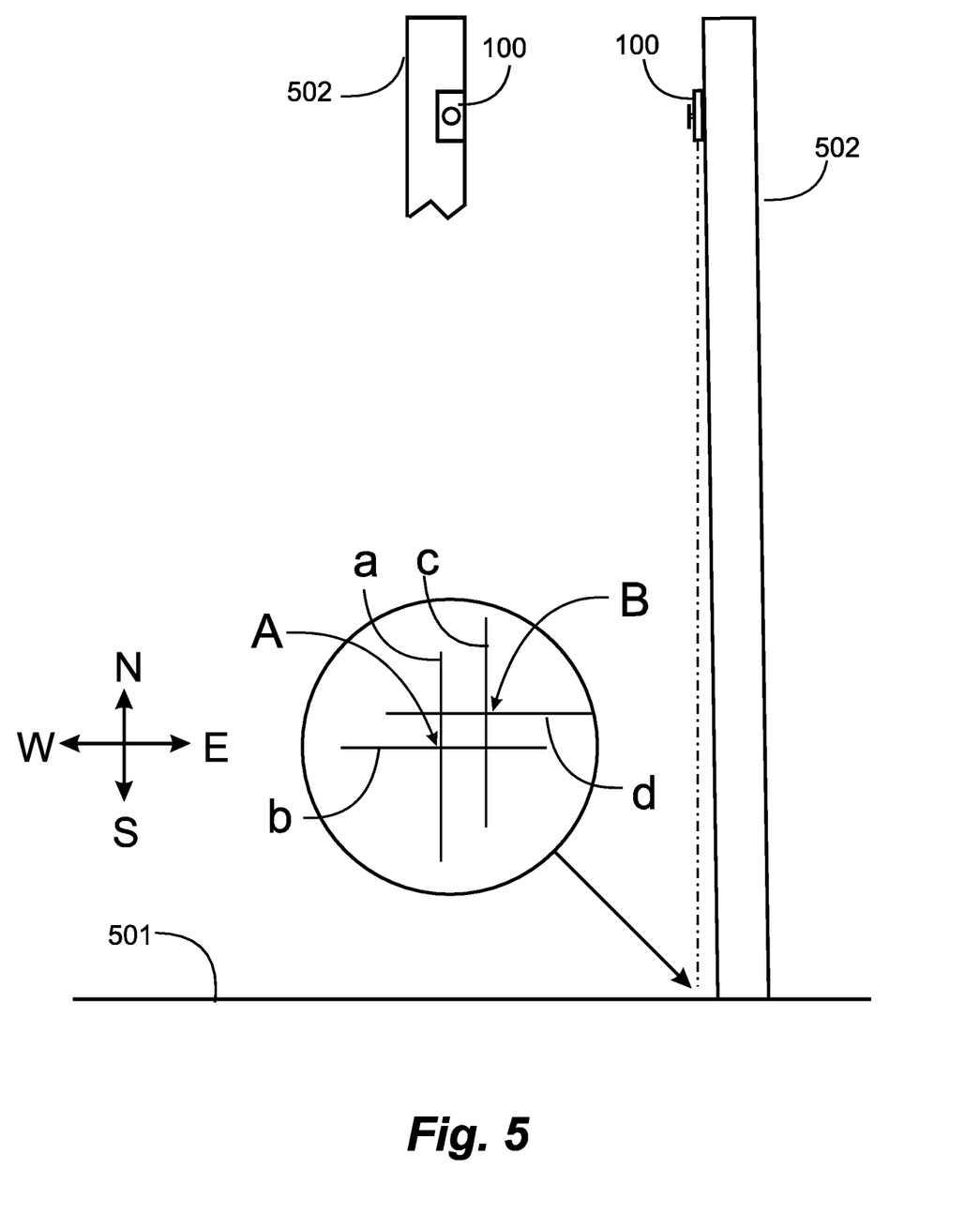
FIG. 5 is an illustration showing a post out-of-plumb and a device according to an embodiment of the invention in use.

FIG. 5 is an illustration of a post 502 that is off plumb relative to a ground surface 501. In this example the post 502 is leaning somewhat to West and somewhat to South (out of the plane of the figure). A laser plumb bob device 100, according to an embodiment of the present invention, is shown attached to the post 502 at a high point distally from floor 501, with one edge aligned with an edge of the post 502, as shown in broken view to the left of the post 502. In placing the device 100 on the post 502, if the post 502 is magnetically-permeable metal, the strips 113 will engage the post 502 magnetically. If the engagement is smooth, switches 202 (see FIG. 4) will both close, enabling the lasers of the device 100. If the post 502 is wooden, the user will use disk 104 to drive pin 112 into the wooden post 502.

The compass indicator on FIG. 5 shows directions in the plane of the ground line 501, with North into the plane of the figure. Device 100 projects laser lines from laser devices 101, 102, and 103. Floating laser device 103 projects a cross comprising lines a and b, with center at A. Horizontal laser device 102 projects line c and vertical laser device 101 projects line d, which cross at B. These two lines, however, are not constrained to move together if the post 100 is moved.

If, having set the device 100 on the post 502, with the laser devices radiating, the user moves post 502 so the top of the post moves North, line d will move toward line b. If the user moves post 502 so the top of the post 502 moves East, line c will move toward line a. When both lines d and b coincide, and lines c and a coincide, the post 502 is plumb, and may be set to remain in that aspect. In one embodiment laser device 103 may be red, and lasers 101 and 102 may be yellow, so when the lines coincide the lines change to orange.

Figure 6:
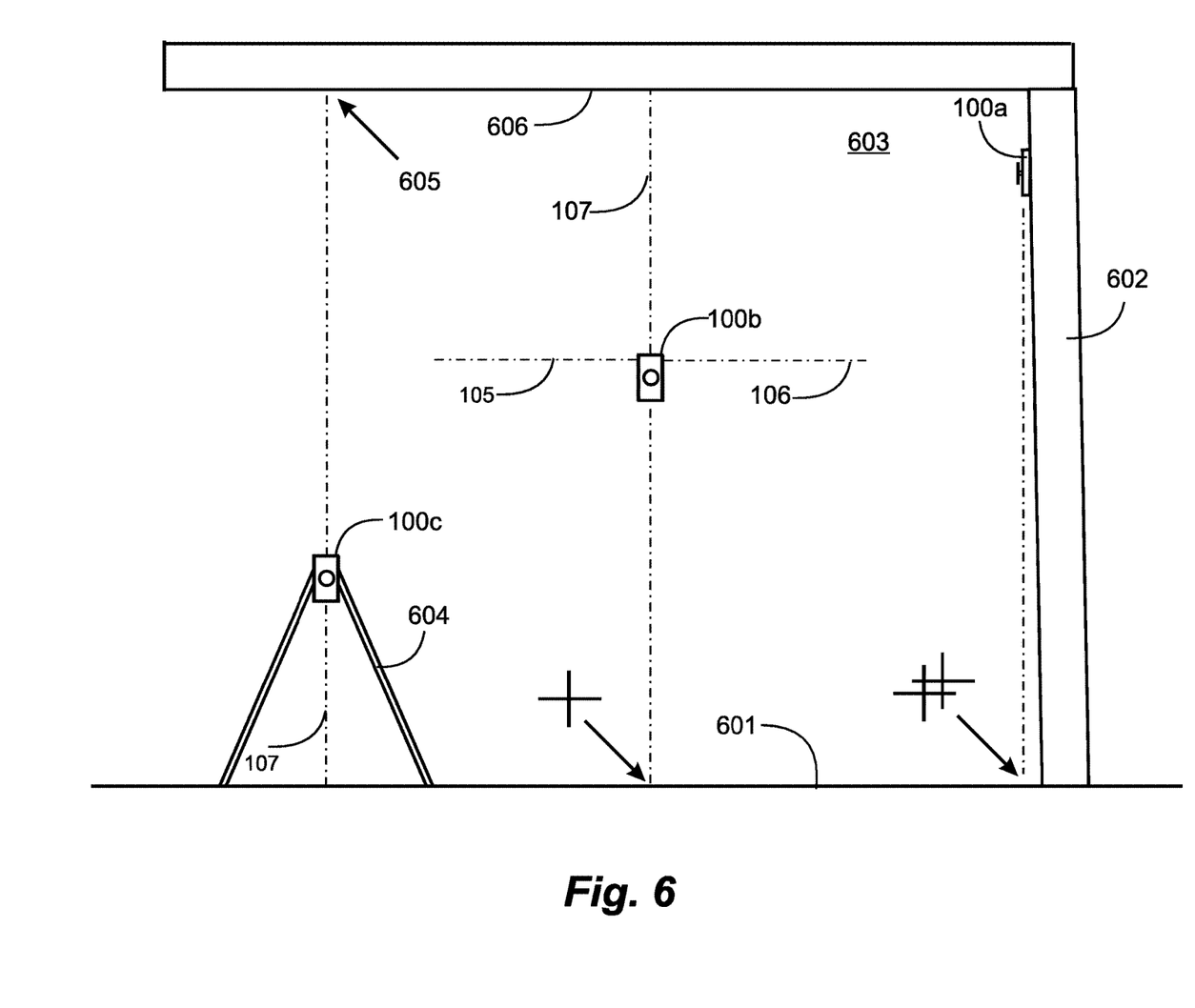
FIG. 6 is an illustration showing devices according to embodiments of the invention in use to plumb walls.

FIG. 6 illustrates three devices 100a, 100b and 100c in use in a project to set walls straight and plumb, for example. One wall 602 between a floor 601 and a ceiling 606 is leaning into the room, and is not vertically plumb. Device 100a has been attached to this wall 602, and laser devices 101, 102, and 103 project on floor 601 close to the wall 602, indicating that the wall 602 is out of plumb. Moving the wall 602 to coincide the linear projections will bring the wall 602 into plumb.

Laser 100b is attached to wall 603, adjacent to wall 602, and the projection of laser devices 101, 102 and 103 coincide, indicating that wall 603 is plumb. Device 100c is mounted on a tripod 604, and leveling the device 100c itself by its projections on the floor 601 enable placing a plumb spot 605 on the ceiling directly over the point on the floor 601. Additionally, the side radiating point lasers may be used to mark level lines on wall 603 of the room. Device 100c may attach to the tripod 604 magnetically.

The skilled person will understand that the embodiments described above are exemplary only, and that other examples may fall within the scope of the invention, which is limited only by the claims.

The invention claimed is:

1. A plumb-bob device, comprising:
a framed enclosure having first and second planar ends, first and second planar sides, a top planar surface and a bottom planar surface;
a first laser device in the framed enclosure, projecting in a first plane from the first end, the first plane orthogonal to the bottom surface;
a second laser device in the framed enclosure, projecting in a second plane from the first end, the second plane parallel with the bottom surface, and at a right angle to the projected plane of the first laser device;
a third laser device in the framed enclosure, projecting in a third and a fourth plane crossed orthogonally, the third laser device suspended by a linear member from a joint on a rigid frame member in the enclosure, such that the third laser device projects in a direction of an axis of the linear member, and may swing in any direction relative to the axis of the linear member, but may not rotate about that axis, and such that with the axis of the linear member orthogonal to the first planar end, the third plane is parallel to the first plane, and the fourth plane is parallel to the second plane;
a power supply and circuitry adapted to power the lasers; and
an attachment interface on the bottom surface adapted to attach the device to a planar surface of an external object.

2. The plumb-bob device of claim 1 wherein the attachment interface comprises a series of magnetic strips on the bottom surface, the strips presenting a bottom plane parallel with and away from the bottom surface, such that placing the device by the strips on a plane surface of an object comprising magnetically permeable material attaches the device to the object.

3. The plumb bob device of claim 2 wherein the circuitry further comprises a first normally open proximity switch implemented on the bottom surface of the enclosure near the first end, and a second normally open proximity switch implemented on the bottom surface of the enclosure near the second end, such that, as the bottom plane of the strips contact a planar surface of an external object, both switches close, indicating that the device is intimately joined to the external object, and closing a circuit that lights the lasers of the device.

4. The plumb-bob device of claim 1 further comprising a pointed pin acting through the device vertically, orthogonal to the top and bottom surfaces, the pin connected to a palm button above the top surface, with a compression spring constraining the pin to be withdrawn to above the bottom surface of the magnetic strips, until a user presses the palm button, advancing the pointed pin to pierce and engage a pliable surface of an object, fastening the device to the surface of the object.

5. The plumb-bob device of claim 1 further comprising a first stationary spot laser projecting orthogonally from the planar first side, a second stationary spot laser projecting orthogonally from the planar second side, co-linear with the first stationary spot laser, and a third stationary spot laser projecting orthogonally from the planar second end, the three stationary spot lasers lying in a common plane.

6. The plumb bob device of claim 1 wherein the power supply is a rechargeable battery, and further comprising a charging port on one surface of the enclosure.

7. The plumb bob device of claim 1 wherein the first and second lasers radiate red and the third laser radiates yellow, such that, when projections coincide, the color turns orange.

8. The plumb bob device of claim 1 wherein the enclosure is formed of rigid polymer material.

9. A laser-implemented plumb bob system, comprising:
a tripod apparatus having foldable and extendable legs, and a planar mounting plate of magnetically-permeable material, the planar mounting plate adapted by universal joint to the tripod to be oriented to attain a position wherein the plane of the mounting plate is vertically plumb with respect to a surface upon which the tripod rests; and
a laser-implemented plumb bob device having a framed enclosure having first and second planar ends, first and second planar sides, a top planar surface and a bottom planar surface, a first laser device in the framed enclosure, projecting in a first plane from the first end, the first plane orthogonal to the bottom surface, a second laser device in the framed enclosure, projecting in a second plane from the first end, the second plane parallel with the bottom surface, and at a right angle to the projected plane of the first laser device, a third laser device in the framed enclosure, projecting in a third and a fourth plane crossed orthogonally, the third laser device suspended by a linear member from a joint on a rigid frame member in the enclosure, such that the third laser device projects in a direction of an axis of the linear member, and may swing in any direction relative to the axis of the linear member, but may not rotate about that axis, and such that with the axis of the linear member orthogonal to the first planar end, the third plane is parallel to the first plane, and the fourth plane is parallel to the second plane, a power supply and circuitry adapted to power the lasers, and a magnetic attachment interface on the bottom surface joining the laser-implemented plumb bob device to the adapted to attach the device to a planar surface of an external object;

wherein the laser-implemented plumb bob device is mounted to the planar mounting plate of the tripod device by magnetic attraction.

* * * * *

UNITED STATES PATENT AND TRADEMARK OFFICE
CERTIFICATE OF CORRECTION

| | | |
|---|---|---|
| PATENT NO. | : 11,320,264 B2 | Page 1 of 1 |
| APPLICATION NO. | : 16/597733 | |
| DATED | : May 3, 2022 | |
| INVENTOR(S) | : Joseph Samuel Melton | |

It is certified that error appears in the above-identified patent and that said Letters Patent is hereby corrected as shown below:

On the Title Page

Item [72], Inventor delete: "Joeseph Samuel Melton"
And insert: --Joseph Samuel Melton--

Signed and Sealed this
Fourteenth Day of June, 2022

*Katherine Kelly Vidal*

Katherine Kelly Vidal
*Director of the United States Patent and Trademark Office*